(12) United States Patent
Ide

(10) Patent No.: US 11,843,864 B2
(45) Date of Patent: Dec. 12, 2023

(54) IMAGE CAPTURING APPARATUS

(71) Applicant: CANON KABUSHIKI KAISHA, Tokyo (JP)

(72) Inventor: Hiroyuki Ide, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 17/679,848

(22) Filed: Feb. 24, 2022

(65) Prior Publication Data

US 2022/0272259 A1 Aug. 25, 2022

(30) Foreign Application Priority Data

Feb. 25, 2021 (JP) ................. 2021-028710

(51) Int. Cl.
*H04N 23/698* (2023.01)
*H04N 23/695* (2023.01)

(52) U.S. Cl.
CPC ......... *H04N 23/698* (2023.01); *H04N 23/695* (2023.01)

(58) Field of Classification Search
CPC .......................... H04N 23/695; H04N 23/698
See application file for complete search history.

(56) References Cited

U.S. PATENT DOCUMENTS

2013/0094848 A1* 4/2013 Wada ................... H04N 23/698
396/448

FOREIGN PATENT DOCUMENTS

JP 6064458 B2 1/2017

* cited by examiner

*Primary Examiner* — Kathleen V Nguyen
(74) *Attorney, Agent, or Firm* — Canon U.S.A., Inc. IP Division

(57) ABSTRACT

An image capturing apparatus includes a fixation unit, a panning unit that has an opening and is configured to rotate in a pan direction relative to the fixation unit, and a lens unit configured to move within the opening in the pan direction and thereby rotate in the pan direction relative to the panning unit. The lens unit rotates in the pan direction at least 360 degrees relative to the fixation unit due to the panning unit rotating in the pan direction relative to the fixation unit and the lens unit rotating in the pan direction relative to the panning unit.

6 Claims, 8 Drawing Sheets

IMAGE CAPTURING APPARATUS

BACKGROUND

Field of the Disclosure

The present disclosure is related to an image capturing apparatus that is movable in a pan direction.

Description of the Related Art

Surveillance cameras are used at places, such as shops, hotels, banks, and stations. The surveillance cameras are normally installed on ceilings and walls. An example of the surveillance cameras is a dome-shaped surveillance camera that has a transparent or semitransparent dome cover shaped like a hemisphere. Under the dome cover, the dome-shaped surveillance camera accommodates a lens unit for imaging an object inside the dome cover and a panning mechanism for shifting the shooting direction of the lens unit. The panning mechanism normally has rotation regulation members (stoppers) at a fixation unit and a panning unit, respectively, which restricts the movement in the pan direction. The lens unit is thereby prevented from rotating when the rotation exceeds a range of approximately 350 degrees.

A panning mechanism of an image capturing apparatus disclosed in Japan Patent No. 6064458 uses a movable rotation regulation member (movable stopper), which enables the lens unit to rotate in the pan direction 360 degrees or more.

SUMMARY

The present disclosure provides an image capturing apparatus equipped with a panning mechanism that enables at least 360-degree pan movement without increasing the number of components.

According to an aspect of the present disclosure, an image capturing apparatus includes a fixation unit, a panning unit that has an opening and is configured to rotate in a pan direction relative to the fixation unit, and a lens unit configured to move within the opening in the pan direction and thereby rotate in the pan direction relative to the panning unit. The lens unit rotates in the pan direction at least 360 degrees relative to the fixation unit due to the panning unit rotating in the pan direction relative to the fixation unit and the lens unit rotating in the pan direction relative to the panning unit.

Further features of the present disclosure will become apparent from the following description of exemplary embodiments with reference to the attached drawings.

DESCRIPTION OF THE EMBODIMENTS

Figure 1:
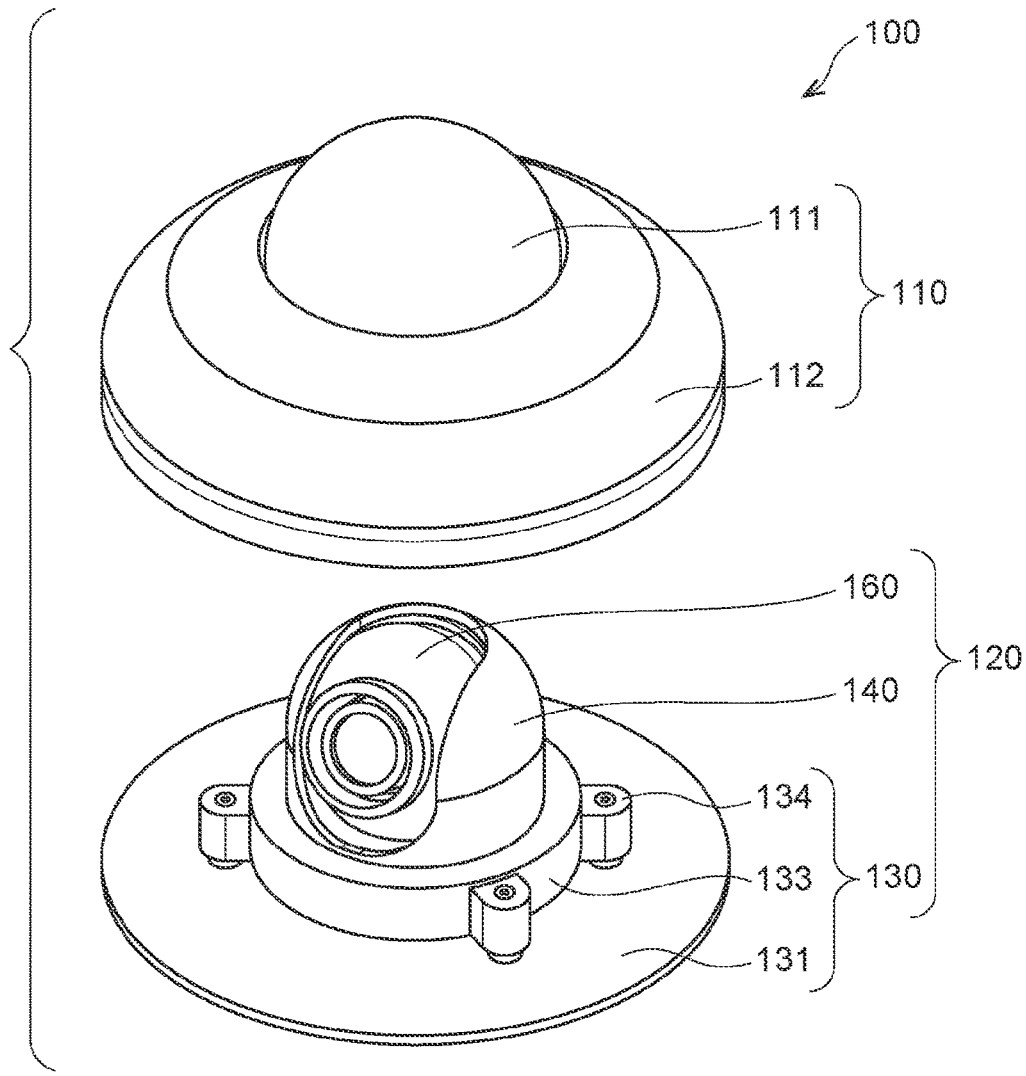
FIG. 1 is a perspective view of a surveillance camera according to one or more aspects of the present disclosure.
Figure 2:
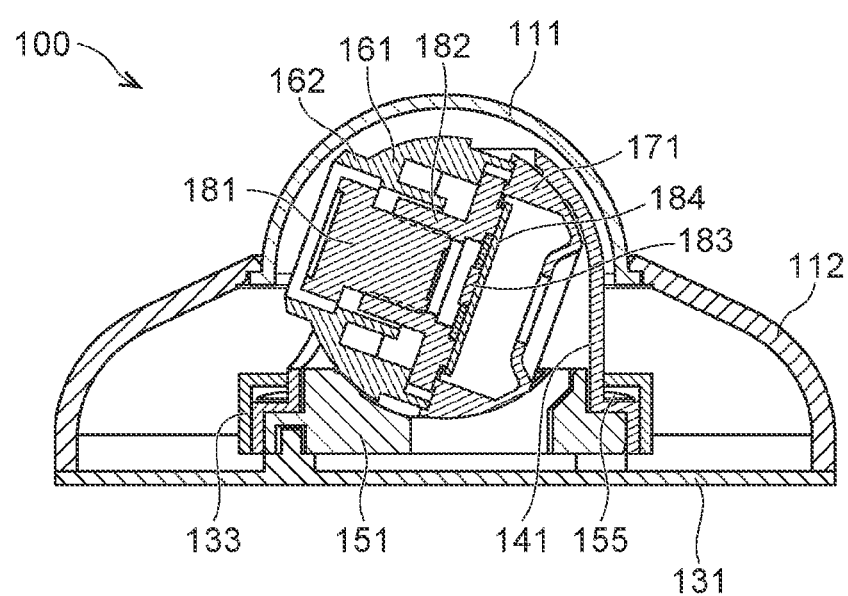
FIG. 2 is a cross-sectional view of the surveillance camera according to one or more aspects of the present disclosure.
Figure 3:
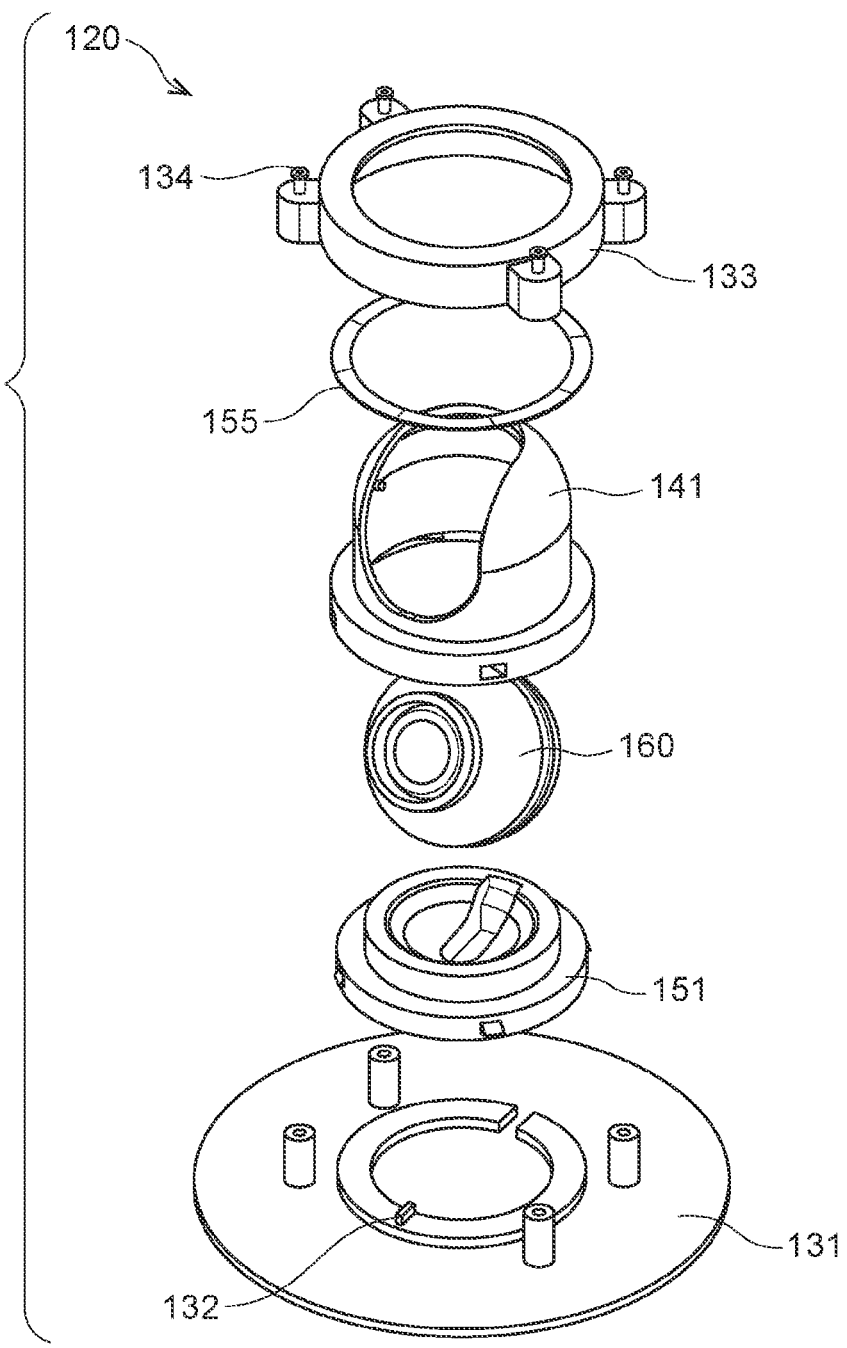
FIG. 3 is an exploded view of a camera unit of the surveillance camera according to one or more aspects of the present disclosure.

An embodiment of the present disclosure will be described in detail with reference to FIGS. 1 to 10. FIG. 1 is a perspective view of a surveillance camera 100 according to the embodiment when an upper cover unit 110 is removed from a camera unit 120. FIG. 2 is a cross-sectional view of the surveillance camera 100 according to the present embodiment. FIG. 3 is an exploded perspective view of the camera unit 120 according to the present embodiment.

The surveillance camera 100 is a dome-shaped surveillance camera. The surveillance camera 100 includes the upper cover unit 110 and the camera unit 120.

As illustrated in FIG. 1, the upper cover unit 110 includes a dome cover 111 and an upper cover 112. The dome cover 111 is a transparent or semitransparent plastic cover. The dome cover 111 is shaped like a hemisphere. The dome cover 111 is fixed to the upper cover 112 by screws (not illustrated).

As illustrate in FIG. 1, the camera unit 120 includes a fixation unit 130, a panning unit 140, and a tilting unit 160. The fixation unit 130 is formed mainly of a lower cover 131, a main holder segment 133 (a main holder portion 133), and a main substrate (not illustrated). The lower cover 131 has an attachment structure (not illustrated) at the bottom surface thereof to be used to fix the surveillance camera 100 to a ceiling, a wall, or the like at an appropriate position. The upper cover 112 and the lower cover 131 serve as a housing of the surveillance camera 100. For example, the upper cover 112 and the lower cover 131 are aluminum die-cast parts.

The main holder segment 133 is fixed to the lower cover 131 by screws 134. The lower cover 131 and the main holder segment 133 support the panning unit 140 so as to enable the panning unit 140 to rotate in a pan direction. The panning unit 140 supports the tilting unit 160 so as to enable the tilting unit 160 to rotate in a tilt direction.

As illustrated in FIGS. 2 and 3, the panning unit 140, which is able to rotate in the pan direction relative to the fixation unit 130, mainly includes a top holder segment 141 and a bottom holder segment 151. The top holder segment 141 has a flange. A wave washer 155 is disposed between the flange of the top holder segment 141 and the main holder segment 133 at the opening thereof. The wave washer 155 urges the top holder segment 141 toward the lower cover 131. Accordingly, the panning unit 140 is urged toward the lower cover 131 by the wave washer 155. The panning unit 140 can move in the pan direction in accordance with a user's operation.

Figure 6:
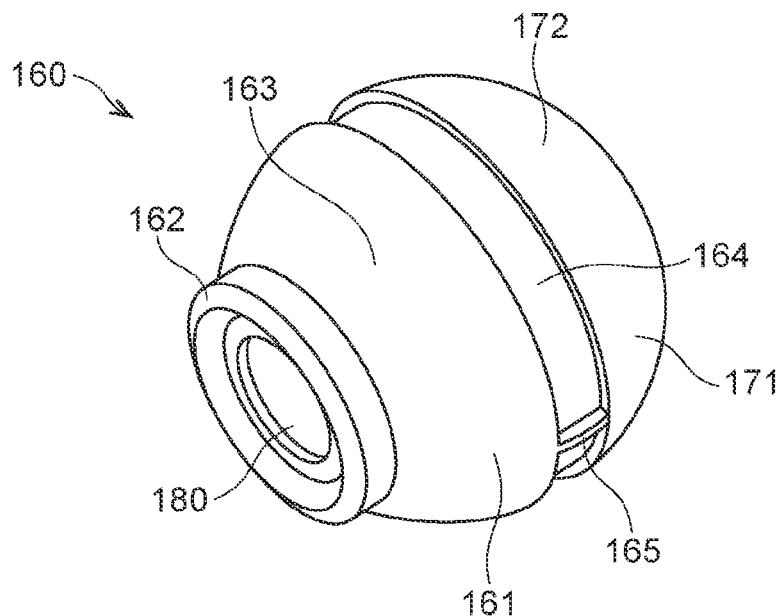
FIG. 6 is a perspective view of a tilting unit of the surveillance camera according to one or more aspects of the present disclosure.

As illustrated in FIG. 6, the tilting unit 160, which is able to rotate in the tilt direction relative to the panning unit 140, mainly includes a lens unit 180, a front holder segment 161, and a rear holder segment 171. The lens unit 180 is formed mainly of a lens-barrel 181, a lens holder 182, a sensor 183, and a sensor substrate 184. The front holder segment 161 is a front cover of the tilting unit 160. The front holder segment 161 serves as a spherical segment 163 (a spherical portion 163) and has a circular protrusion 162. The rear holder segment 171 is a rear cover of the tilting unit 160. The rear holder segment 171 serves as a spherical segment 172. When a torque is applied to the tilting unit 160 against an urging force of the wave washer 155, the tilting unit 160 can move. The tilting unit 160 can rotate in the tilt direction in accordance with a user's operation.

Figure 7:
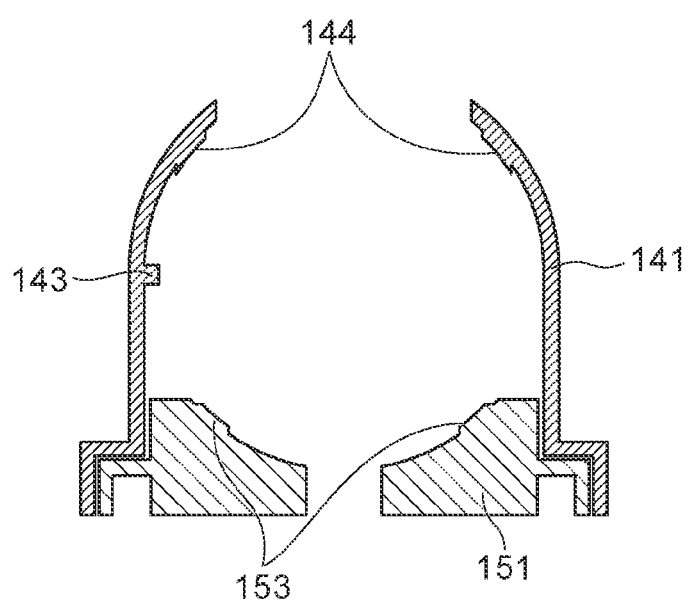
FIG. 7 is a cross-sectional view of the panning unit of the surveillance camera according to one or more aspects of the present disclosure.

Sphere support portions 144 are formed at the top holder segment 141 as illustrated in FIG. 7. Sphere support portions 153 are also formed at the bottom holder segment 151 as illustrated in FIG. 7. The sphere support portions 153 may be formed at the lower cover 131. The spherical segments 163 and 172 are in contact with the sphere support portions 144. The spherical segments 163 and 172 are also in contact with the sphere support portions 153. As described above, the wave washer 155 urges the top holder segment 141 toward the lower cover 131. The tilting unit 160 is nipped between the sphere support portions 144 of the top holder segment 141 and the sphere support portions 153 of the bottom holder segment 151 due to the urging force of the wave washer 155.

The lens unit 180 is placed under the dome cover 111. The lens unit 180 images the outside (an object) from inside the surveillance camera 100 and generates an image signal. The lens-barrel 181 is formed mainly of a barrel and a fixed lens fixed in the barrel. The lens holder 182 holds the lens-barrel 181 and the sensor substrate 184. The sensor 183 is an image capturing element that captures an image formed by the lens-barrel 181. The sensor substrate 184 supports the sensor 183. The image signal generated by the lens unit 180 is transmitted to a main substrate (not illustrated) via a cable (not illustrated). The main substrate sends an encoded image signal, for example, to an external camera control device via a network.

Figure 4:
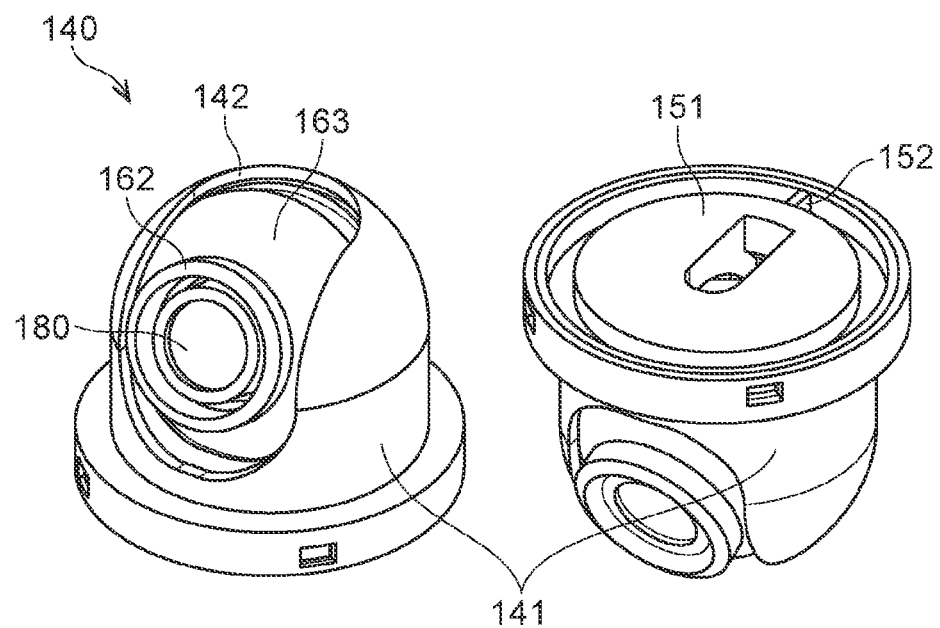
FIG. 4 shows perspective views of a panning unit of the surveillance camera according to one or more aspects of the present disclosure.
Figure 5:
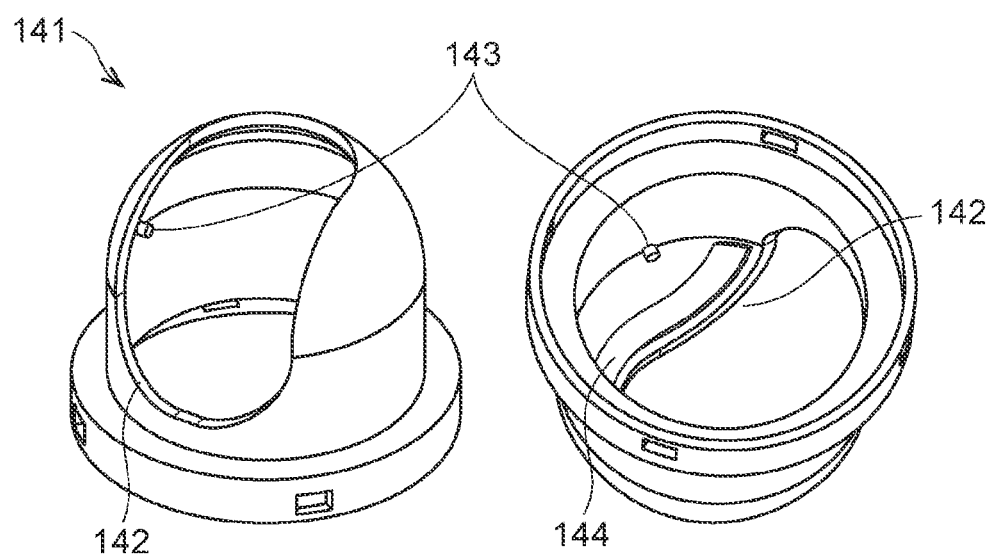
FIG. 5 shows perspective views illustrating a top holder segment of the surveillance camera according to one or more aspects of the present disclosure.

The following describes movement-regulation structures for pan, tilt, and rotation movements. FIG. 4 shows perspective views of the panning unit 140 according to the present embodiment. FIG. 5 shows perspective views of the top holder segment 141 according to the present embodiment. FIG. 6 is a perspective view of the tilting unit 160 according to the present embodiment. FIG. 7 is a cross-sectional view of the panning unit 140 according to the present embodiment.

A stopper 132 is formed at the lower cover 131 of the fixation unit 130. The stopper 132 corresponds to a first control stopper. A stopper 152 is formed at the bottom holder segment 151 of the panning unit 140. The stopper 152 corresponds to a second control stopper. As described above, the panning unit 140 rotates in the pan direction relative to the fixation unit 130. The pan movement of the panning unit 140 relative to the fixation unit 130 is restricted due to the stopper 132 and the stopper 152 abutting each other. The maximum angle of rotation in the pan movement is referred to as a "first panning angle". Since the stopper 132 and the stopper 152 have thicknesses in the circumferential direction of the panning unit 140, the first panning angle becomes less than 360 degrees. In the present example, the first panning angle is approximately 350 degrees.

The top holder segment 141 of the panning unit 140 has an opening 142. The front holder segment 161 of the tilting unit 160 has the protrusion 162. As described above, the tilting unit 160 tilts relative to the panning unit 140. When the tilting unit 160 rotates in the tilt direction relative to the panning unit 140, the protrusion 162 moves within the opening 142. The movement of the protrusion 162 is restricted by the edge of the opening 142. In other words, the range of movement of the tilting unit 160 is defined by the opening 142.

As illustrated in FIG. 5, a column-shaped stopper 143 is formed at the inside surface of the top holder segment 141. The stopper 143 corresponds a third control stopper. The tilting unit 160 has a groove 164 as illustrated in FIG. 6. A stopper 165 is formed in the groove 164. The stopper 165 corresponds to a fourth control stopper. When the tilting unit 160 rotates about the optical axis (moves in the rotational direction), the range of rotation of the tilting unit 160 is restricted, for example, to 350 degrees due to the stopper 165 abutting the stopper 143.

Figure 8:
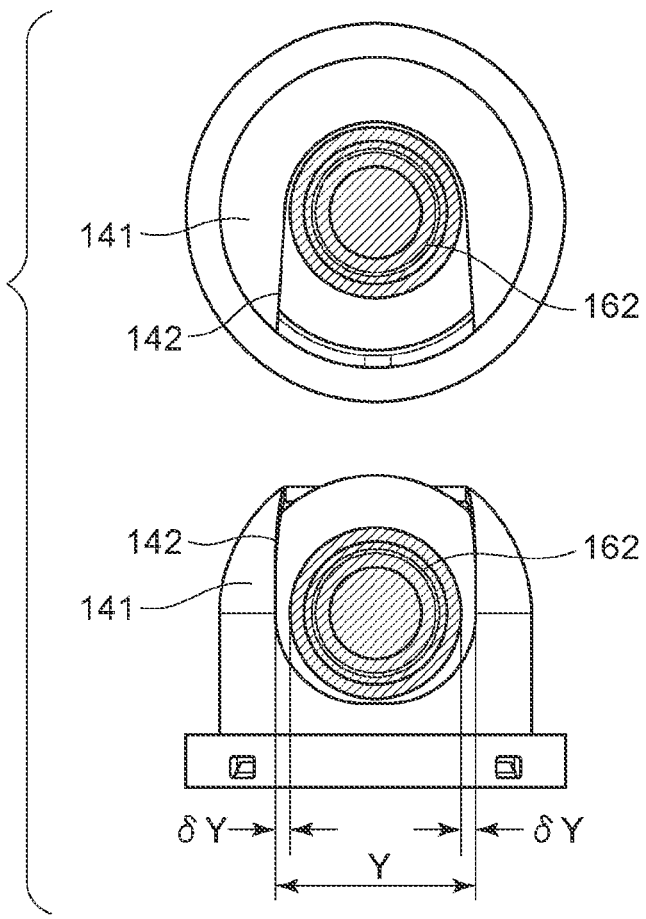
FIG. 8 shows front and top views of the panning unit of the surveillance camera according to one or more aspects of the present disclosure.
Figure 9:
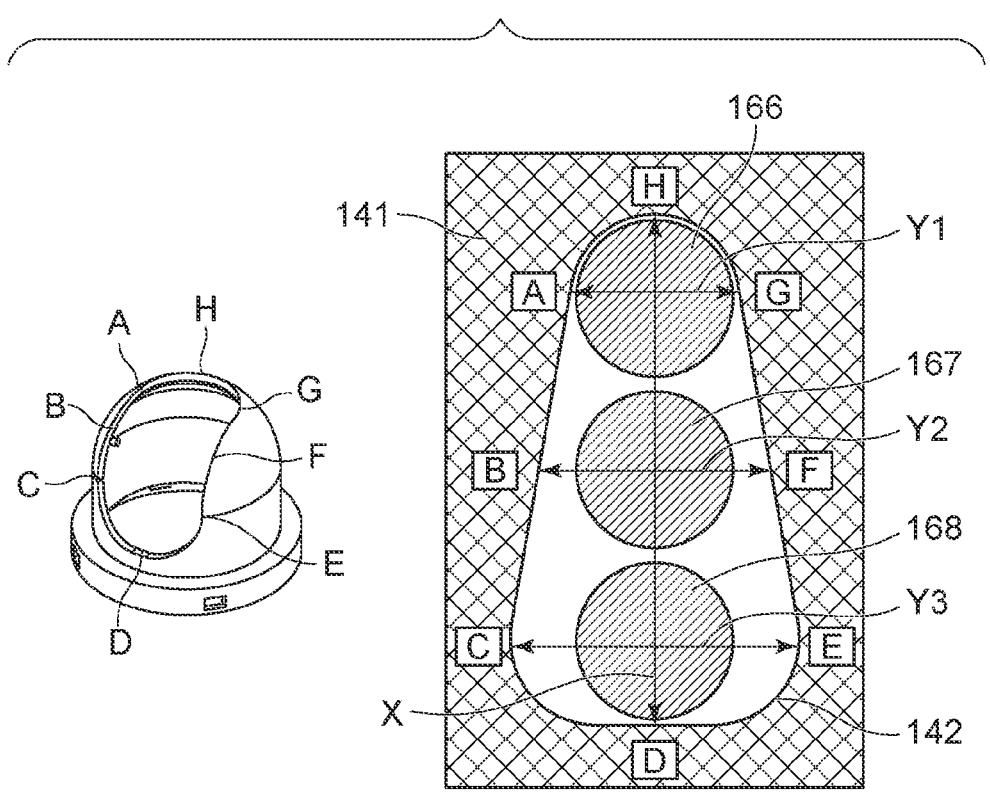
FIG. 9 is a schematic diagram illustrating an opening of the surveillance camera according to one or more aspects of the present disclosure.

The following describes movement-regulation structures for pan and tilt movements, which is a distinguishing feature of the present disclosure. FIG. 8 shows front and top views of the panning unit 140 according to the present embodiment. FIG. 9 is a schematic diagram illustrating the opening 142 according to the present embodiment. As illustrated in FIG. 9, the opening 142 has a first length X in the first direction in which the tilting unit 160 rotates in the tilt direction relative to the panning unit 140. As illustrated in FIG. 8, the opening 142 has a second length Y in the second direction in which the tilting unit 160 rotates in the pan direction o the panning unit 140.

The pan movement of the tilting unit 160 is described first. The second length Y of the opening 142 in the second direction is greater than the diameter of the protrusion 162 of the tilting unit 160. A right gap and a left gap, each of which having a width of δY, are formed between the edge of the opening 142 and the protrusion 162, which allows the tilting unit 160 to rotate in the pan direction relative to the panning unit 140. The gaps each having the width of δY allow the tilting unit 160 to rotate in the pan direction within a second panning angle relative to the panning unit 140. In other words, the total of the first panning angle and the second panning angle are set to be 360 degrees or more so that the lens unit 180 can rotate in the pan direction 360 degrees. In the present example, the second panning angle is approximately in the range of +5 to −5 degrees (total 10 degrees). Although the second panning angle is set to be approximately in the range of +5 to −5 degrees here, the second panning angle may be adjusted relative to the first panning angle so as to enable the lens unit 180 to rotate in the pan direction about 360 degrees. Consequently, the panning unit 140 can rotate in the pan direction about 350 degrees relative to the fixation unit 130, and the tilting unit 160 also can rotate in the pan direction relative to the panning unit 140, which enables the lens unit 180 to rotate in the pan direction approximately 360 degrees.

Next, the tilt movement of the tilting unit 160 is described. When the tilting angle is an angle between the panning axis and the optical axis of the lens unit 180, the tilting unit 160 can rotate in the tilt direction from a first tilting angle to a second tilting angle. In the present example, the first tilting angle is 0 degrees, in the present example, the second tilting angle is 90 degrees. In FIG. 9, when the protrusion 162 is positioned at a tilting angle of 0 degrees, the protrusion 162 is represented as a protrusion 166. When the protrusion 162 is positioned at a tilting angle of 45 degrees, the protrusion 162 is represented as a protrusion 167. When the protrusion 162 is positioned at a tilting angle of 90 degrees, the protrusion 162 is represented as a protrusion 168. A length Y1 is the second length Y in the second direction at a tilting angle of 0 degrees. A length Y2 is the second length Y in the second direction at a tilting angle of 45 degrees. A length Y3 is the second length Y in the second direction at a tilting angle of 90 degrees.

When the tilting unit 160 rotates in the pan direction relative to the panning unit 140, the allowable amount of movement of the protrusion 162 becomes larger as the tilting angle becomes larger. In other words, the length Y2 at a tilting angle of 45 degrees is greater than the length Y1 at a tilting angle of 0 degrees. The length Y3 at a tilting angle of 90 degrees is greater than the length Y2 at a tilting angle of 45 degrees. When the tilting angle is small, the width δY is also small. Since the width δY is small when the tilting angle is small, the second length Y of the opening in the second direction also becomes small.

If the opening 142 is too large, the top holder segment 141 may be more susceptible to deformation due to an urging force of the wave washer 155. Due to the deformation, the top holder segment 111 becomes less capable of holding the tilting unit 160 in alignment with the shooting direction. Forming the opening 142 as small as possible leads to prevention of the top holder segment 141 from deforming due to the reaction force of the wave washer 155 and thereby leads to prevention of the surveillance camera 100 from changing the shooting direction unexpectedly.

Figure 10:
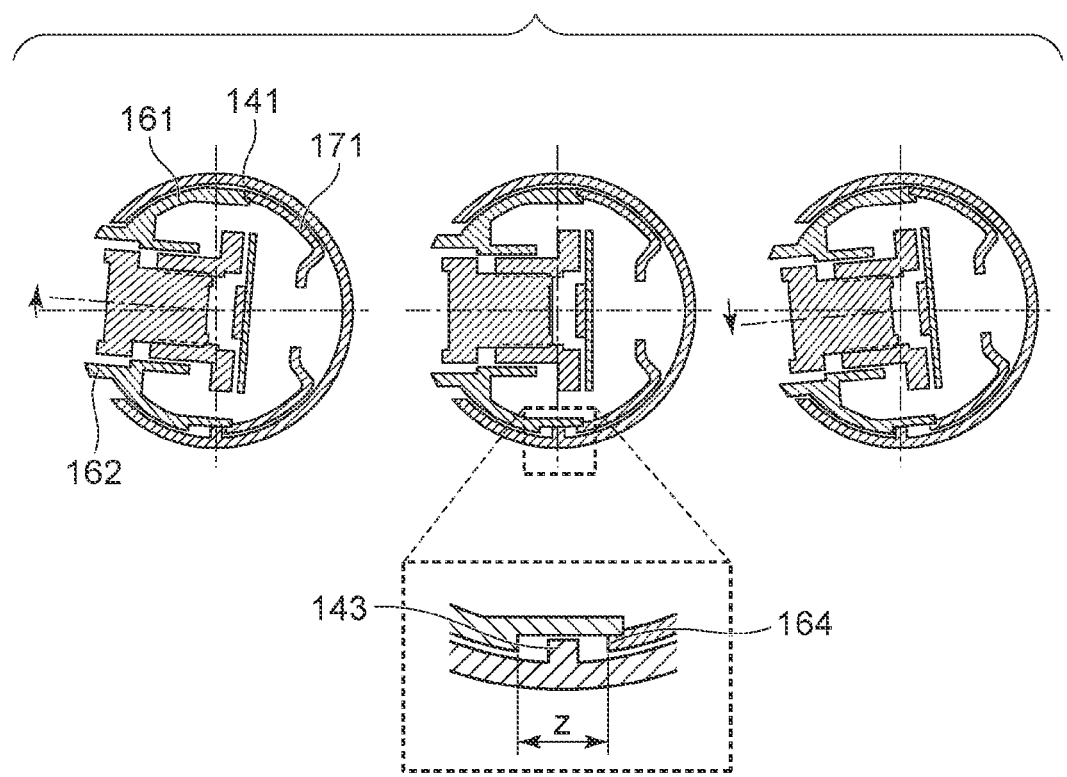
FIG. 10 shows cross-sectional views of the panning unit according to one or more aspects of the present disclosure.

The following describes the relation of the groove 164 and the pan movement. FIG. 10 shows cross-sectional views of the panning unit 140 at a tilting angle of 90 degrees according to the present embodiment. The groove 164 has a third length Z so as to allow the tilting unit 160 to rotate in the pan direction relative to the panning unit 140. The third length Z is greater than the diameter of a stopper 143. The third length Z is set so as to allow the tilting unit 160 to rotate in the pan direction. As a result, the tilting unit 160 can rotate in the pan direction 360 degrees or more relative to the fixation unit 130.

As described above, the surveillance camera 100 of the present example includes the fixation unit 130 and the panning unit 140 that has the opening 142 and is configured to rotate in the pan direction relative to the fixation unit 130. The surveillance camera 100 also includes the lens unit 180 that is configured to move within the opening 142 in the tilt direction and thereby rotate in the tilt direction relative to the panning unit 140. The opening 142 is formed such that the lens unit 180 can move within the opening 142 in the pan direction and thereby rotate in the pan direction relative to the panning unit 140. In addition, the lens unit 180 is configured to rotate in the pan direction at least 360 degrees relative to the fixation unit 130 due to the panning unit 140 rotating in the pan direction relative to the fixation unit 130 and the lens unit 180 rotating in the pan direction relative to the panning unit 140. Thus, the surveillance camera 100 equipped with the panning mechanism that enables at least 360-degree pan movement can be provided without increasing the number of components.

In the surveillance camera 100, the fixation unit 130 has a first control stopper, and the panning unit 140 has a second control stopper. The pan movement of the panning unit 140 relative to the fixation unit 130 is restricted due to the first control stopper and the second control stopper abutting each other. Thus, the movement in the pan direction can be restricted with a simple structure.

The pan movement of the lens unit 180 relative to the panning unit 140 is restricted due to the lens unit 180 abutting the edge of the opening 142. Thus, the movement in the pan direction can be restricted with a simple structure.

The panning angle over which the panning unit 140 is able to rotate in the pan direction relative to the fixation unit 130 is greater than the panning angle over which the lens unit 180 is able to rotate in the pan direction relative to the panning unit 140. Thus, the surveillance camera 100 equipped with the panning mechanism that enables at least 360-degree pan movement can be provided without increasing the size of the opening 142 excessively.

The tilting unit 160 includes the lens unit 180 and the cover member that covers the lens unit 180. The tilting unit 160 is formed spherically so as to rotate about the optical axis of the lens unit 180. The panning unit 140 has the third control stopper, and the tilting unit 160 has the groove 164 formed circumferentially therearound and also has the fourth control stopper formed in the groove 164. The rotation movement of the tilting unit 160 about the optical axis is restricted due to the third control stopper and the fourth control stopper abutting each other. Thus, the movement in the rotational direction can be restricted with a simple structure.

The width of the groove 164 in the optical axis direction is such that the lens unit 180 is able to rotate in the pan direction relative to the panning unit 140. Thus, the movement in the rotational direction can be restricted while allowing the lens unit 180 to rotate in the pan direction.

The length of the opening 142 in the pan direction is such that the length becomes greater as the tilting angle between the panning axis and the optical axis of the lens unit 180 becomes greater. Accordingly, forming the opening 142 as small as possible as above leads to prevention of the top holder segment 141 from deforming due to the reaction force of the wave washer 155 and thereby leads to prevention of the surveillance camera 100 from changing the shooting direction unexpectedly.

The present disclosure is not limited only to this embodiment but various modifications and alterations can be made within the spirit of the disclosure.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2021-028710, filed Feb. 25, 2021, which is hereby incorporated by reference herein in its entirety.

What is claimed is:

1. An image capturing apparatus, comprising:
   a fixation unit;
   a panning unit that has an opening and is configured to rotate in a pan direction, relative to the fixation unit; and
   a lens unit configured to move within the opening in the pan direction and thereby rotate in the pan direction, relative to the panning unit,
   wherein the lens unit rotates in the pan direction at least 360 degrees relative to the fixation unit by rotating of the panning unit in the pan direction relative to the fixation unit and rotating of the lens unit in the pan direction relative to the panning unit,
   the fixation unit has a first stopper,
   the panning unit has a second stopper, and
   movement of the panning unit relative to the fixation unit in the pan direction is restricted by the first stopper and the second stopper abutting each other.

2. The image capturing apparatus according to claim 1, wherein pan movement of the lens unit relative to the panning unit is restricted by the lens unit abutting an edge of the opening.

3. The image capturing apparatus according to claim 1, wherein a panning angle over which the panning unit is able to rotate in the pan direction relative to the fixation unit is greater than a panning angle over which the lens unit is able to rotate in the pan direction relative to the panning unit.

4. The image capturing apparatus according to claim 1, further comprising:

a spherically shaped tilting unit that has the lens unit and a cover member covering the lens unit and is configured to rotate about an optical axis of the lens unit, wherein the panning unit has a third stopper, the tilting unit has a groove formed circumferentially therearound and a fourth stopper formed in the groove, and rotation of the tilting unit about the optical axis is restricted by the third stopper and the fourth stopper abutting each other.

5. The image capturing apparatus according to claim 4, wherein a width of the groove in the optical axis direction is such that the lens unit is able to rotate in the pan direction relative to the panning unit.

6. The image capturing apparatus according to claim 1, wherein the lens unit is configured to move in a tilt direction and thereby rotate in the tilt direction relative to the panning unit, and a length of the opening in the pan direction is such that the length becomes greater as a tilting angle between a panning axis and an optical axis of the lens unit becomes greater.

* * * * *